(12) United States Patent
Tell et al.

(10) Patent No.: US 6,205,326 B1
(45) Date of Patent: Mar. 20, 2001

(54) METHOD FOR DETERMINING WHEN A COMMUNICATION UNIT IS LOCATED WITHIN A PREFERRED ZONE

(75) Inventors: Daniel Francis Tell, Lake Forest; William R. Bayer, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/095,669

(22) Filed: Jun. 10, 1998

(51) Int. Cl.[7] .................................................. H04M 11/00
(52) U.S. Cl. ........................................... 455/406; 455/418
(58) Field of Search ..................................... 455/406, 421, 455/433, 432, 435, 418, 419, 456, 457

(56) References Cited

U.S. PATENT DOCUMENTS 5,946,615 * 8/1999 Holmes et al. ...................... 455/412
6,018,653 * 1/2000 Hietalahti et al. ................... 455/406

* cited by examiner

Primary Examiner—Lee Nguyen
(74) Attorney, Agent, or Firm—John B. MacIntyre; Kenneth A. Haas

(57) ABSTRACT

The present invention provides a communication system (100) and a method for determining when a communication unit (105) is located within a preferred zone in the cellular communication system (100). The cellular communication system (100) includes a plurality of cells. A preferred zone for a communication unit (100) is created. Radio characteristics associated with the preferred zone, such as pilot signal, cell ID, and distance, are obtained. It is then determined, based at least in part upon the radio characteristics, when the communication unit (100) is located within the preferred zone.

24 Claims, 2 Drawing Sheets

METHOD FOR DETERMINING WHEN A COMMUNICATION UNIT IS LOCATED WITHIN A PREFERRED ZONE

FIELD OF THE INVENTION

The invention relates generally to wireless communication systems and more particularly to locating and notifying a communication unit of zone location information in such wireless communication systems.

BACKGROUND OF THE INVENTION

In location based billing schemes associated with wireless communication systems, a key problem is the notification of the communication unit as to whether they are in a low rate zone or a high rate zone. A key to this notification is to provide the notification to the communication unit before the communication unit actually initiates a call. Today's systems can inform the subscriber during or after the call, but no means exists for continuously indicating to an idle communication unit the rate zone which is currently in use. In addition, current notification is at a cell level, not at any subset of the cell.

Thus, a need exists for a method and apparatus which overcomes the deficiencies of the prior art.

DETAILED DESCRIPTION OF A PREFERRED EMBODIMENT

Figure 1:
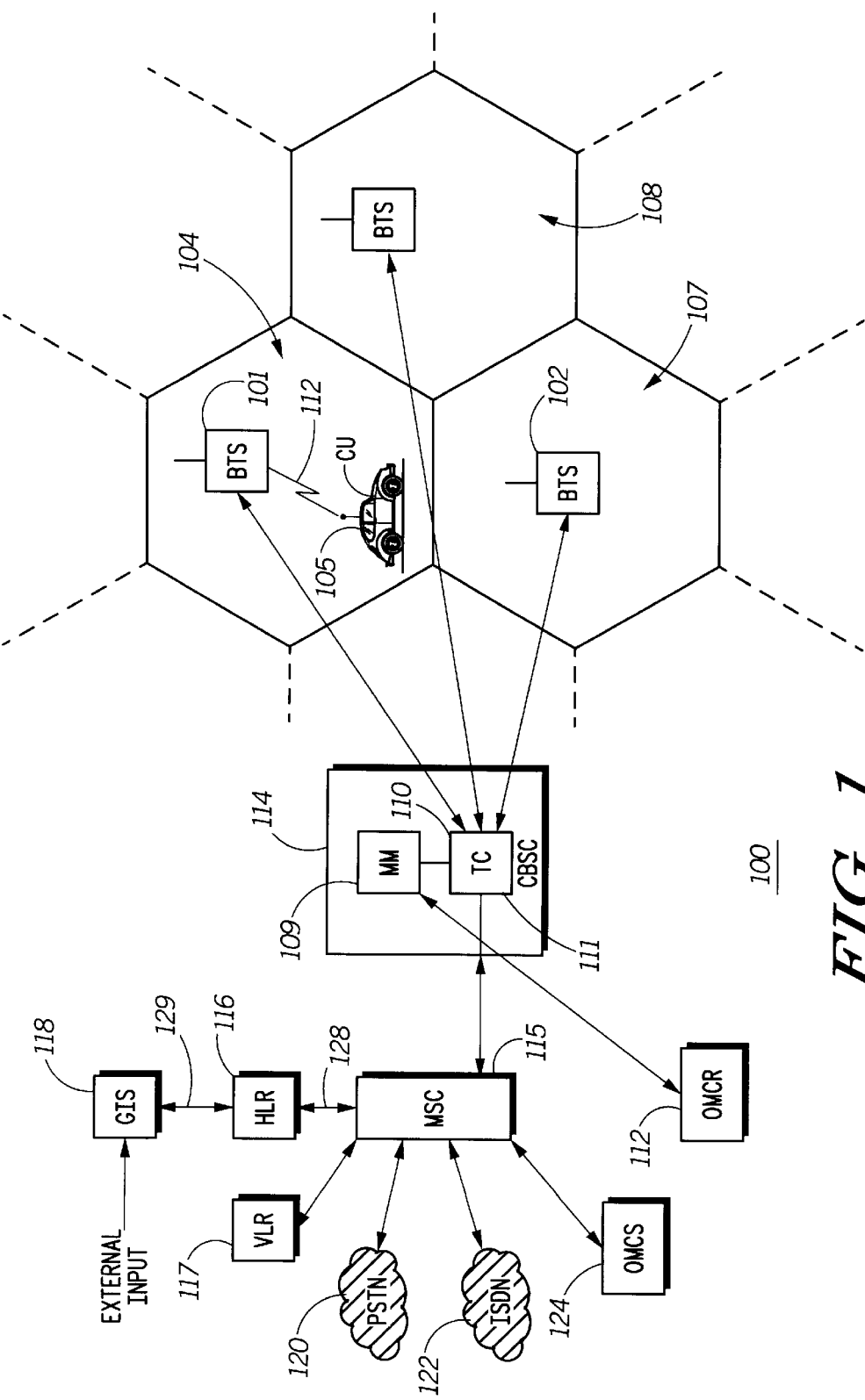
FIG. 1 generally depicts a wireless communication system for implementing zone location notification of a communication unit in accordance with the invention.

FIG. 1 generally depicts a wireless communication system for implementing zone location notification of a communication unit in accordance with the invention. In the preferred embodiment, the wireless communication system is a CDMA communication system 100 which is compatible with TIA/EIA/IS-95A/B, *Mobile Station-Base-station Compatibility Standard for Dual Mode Wideband Spread Spectrum Cellular System*, March 1995, published by the Electronic Industries Association (EIA), 2001 Eye Street, N.W., Washington, D.C. 20006. Such a CDMA communication system 100 is substantially well known in the art.

The following is a list of definitions for the acronyms used in FIG. 1:

BTS Base Transceiver Station
CBSC Cen tralized Base Station Controller
Cu Communication Unit
GIS Geographic Information System
GSM Groupe Special Mobile
HLR Home Location Register
ISDN Integrated Services Digital Network
MM Mobility Manager
MSc Mobile Switching Center
OMCR operations and M aintenance Center—Radio
OMCS Operations and Maintenance Center—Switch
PSTN Public Switched Telephone Network
TC Transcoder
VLR Visitor Location Register As shown in FIG. 1, a first BTS 101 is located in a first coverage area 104 and communicates with a communication unit 105. Communication is via a digital radio channel 112 which contains data information compatible with a CDMA communication system as defined in IS-95A/B. As stated above, the communication station 105 is compatible with TIA/EIA/IS-95A/B, *Mobile Station-Base-station Compatibility Standard for Dual Mode Wideband Spread Spectrum Cellular System*, March 1995, published by the Electronic Industries Association (EIA), 2001 Eye Street, N.W., Washington, D.C. 20006.

Also included in FIG. 1 are BTSs 102–103 located within corresponding coverage areas 107–108. Each base station 101–103 is coupled to a centralized base station controller (CBSC) 114 which includes a TC 111 and a MM 109. As is clear from FIG. 1, TC 110 routes the speech/data information to/from the BTSs 101–103 under control from the MM. The speech/data information is routed to MSC 115 which provides switching functions for access to PSTN 120 or ISDN 122. Link 126 between CBSC 114 and MSC 115 is an A+ interface which is well known in the art. HLR 116 and VLR 117 provide location and billing services for the entire system as is also well known in the art, while the OMCS 124 and the OMCR 112 provide diagnostics and maintenance services for the entire system as is also well known in the art. GIS 118, which is not typically included in wireless communication systems, facilitates zone location notification of a communication unit in accordance with the invention as described below. Links 128–129 between MSC 115/HLR 116 and HLR 116/GIS 118 are IS-41 compatible links which are well known in the art. As one skilled in the art will appreciate, the concepts described herein in accordance with the invention can be equally implemented in the Groupe Special Mobile (GSM) digital wireless communication system as well. In this embodiment, links 126 and 128–129 are an A interface and MAP protocol which are each well known in the art.

The concept behind zone location notification of a communication unit in accordance with the invention is that the communication unit can determine the relative location of the communication unit as the communication unit moves through the system. However, in the preferred embodiment, the communication unit must be told whether this relative location corresponds to a preferred, low-rate zone or not. Receiving zone location information involve cooperation with wireless communication system 100.

As shown in FIG. 1, GIS 118 receives external input in the form of location information of communication unit 105. In the preferred embodiment, the location information input to GIS 118 can either be a street address, landmarks (bridges, buildings, waterways), etc. One skilled in the art will appreciate that anything which could represent the location of communication unit 105 could be used. The important aspect of the location information is that the input location will eventually represent an area where a user of communication unit 105 desires to have a low-rate zone (or a preferred zone) for billing purposes. For example, if a user of communication unit 105 uses her communication unit mostly at home, and desires her low rate zone to be a zone surrounding her house, then she would input her street address for the location information. In the preferred embodiment, the location information is provided to the operator of the system at the time of purchase of the communication unit 105 and/or at the time of service subscription.

Once GIS 118 has the location information for a particular user of communication unit 105, GIS 118 correlates that location information with a radio frequency (RF) coverage plan to produce radio characteristics which include a specific cell, pilot channel which includes a pseudo-random noise (PN) offset code and a range (or "distance from BTS") offset. The range offset is represented by chips or time slices, where every chips corresponds to approximately 800–1000 feet. This coverage plan can be generated by a tool that utilizes simulations based upon the current system parameters or upon tools known in the art. Such tools move through the system and download the current coverage information of different pilot signals throughout the system into the database within the GIS. One such tool that can generate an RF coverage plan is commercially available from "MOTOROLA. INC." under the tradename "NETPLAN". In the preferred embodiment, an intermediate step in the correlation process first correlates the location information with a latitude (lat)/longitude (long) value, which is then correlated to the (RF) coverage plan. In both correlations, databases are analyzed to produce the lat/long value and the specific cell, pilot channel and range offset value. As one skilled in the art will appreciate, other methods could be utilized to produce the specific cell, pilot channel and range offset value corresponding to the location information.

The radio characteristics which include a specific cell, pilot channel and a range offset produced by GIS 118 can be used to essentially plot, using the RF coverage plan database, an area which defines the low rate zone (preferred zone) for the user of communication unit 105 based on the location information provided by the user.

In an alternate embodiment of the present invention, the step of creating a preferred zone can be accomplished based upon input from a user of communication unit 105. The user of communication unit 105 can input, into communication unit 105, that the cell that he is currently associated with should become the preferred zone. This can be accomplished through a feature code sent from communication unit 105, such as by pressing "*71" on the keypad of communication unit 105. Upon pressing "*71", or some other key sequence, communication unit 105 updates memory within communication unit 105 with the cell ID of the cell the user is currently associated with, the pilot signal of the cell, and a distance offset.

Communication unit 105 sends the feature code, such as *71, to BTS 101. BTS 101 processes this feature code as it would process any other feature code. BTS 101 forwards the feature code to CBSC 104. CBSC 104 forwards the feature code to MSC 115. MSC 115 preferably generates a billing record for the feature being processed. In addition, MSC 115 can provide a success tone to communication unit 105 to indicate that the current cell site has successfully been made the preferred zone.

Alternately, cellular system 100 can initiate an upload of preferred zone information relating to communication unit 105. Such information includes the pilot signal of BTS 101, the cell identifier of BTS 101, and the distance of communication unit 105 from BTS 101. BTS 101 sends a message to communication unit 105 for communication unit 105 to send up the preferred zone information. Communication unit 105 sends the information over the air the BTS 101. BTS 101 sends the preferred zone information to CBSC 104, which in turn forwards the preferred zone information to MSC 115. MSC 115 sends the preferred zone information to HLR 116, which sends the information to GIS 118. GIS 118 then updates the preferred zone information for communication unit 105 within the GIS database. The new cell, in this instance 101, is then treated as the preferred zone.

It should be understood that communication unit 105 may be in communication with multiple BTSs at multiple cells. This occurs when communication unit 105 is located in an area of overlapping cell coverage. In such a scenario, assuming that a calibration has already occurred, communication unit 105 transmits the pilot signal, the cell ID, and the distance from the serving BTS. The infrastructure can derive distance from other sites based upon the time difference of arrival of pilot signals from other BTSS.

Figure 2:
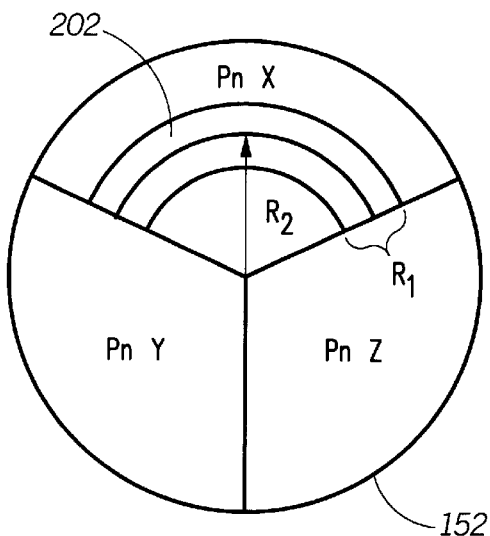
FIG. 2 generally depicts a situation where location information related to a communication unit is in a single sector in accordance with the invention.

FIG. 2 generally depicts a situation where location information related to a communication unit is in a single sector in accordance with the invention. As shown in FIG. 2, such an area is shown in FIG. 2 as preferred area 202. Preferred area 202 is produced using the radio characteristics: the specific cell information corresponds to coverage area (or cell) 104; the pilot channel information including a pseudo-random noise (PN) offset code corresponds to PN X; and the range offset value corresponds to the distance $R_2$ of the preferred zone 202 from the center of cell 104 (actually, from BTS 101). Because of measurement uncertainty of communication unit 105, a radius range $R_1$ shown in FIG. 2 contributes to the preferred zone 202.

During system access, communication unit 105 transmits access information to BTS 101. Upon receipt of the access information, BTS 101 determines the actual distance of communication unit 105 from BTS 101 by determining the delay in the transmission of the access information. Based on this information, BTS 101 then transmits a delay parameter back to communication unit 105 to essentially calibrate the timing of communication unit 105 based on its actual position. This step is necessary since communication unit 105, without receiving the delay parameter, would set its own timing to that of BTS 101. Without calibration, communication unit 105 would not account for the impact of propagation delay on the timing, which effectively creates a skewed distance value. In addition, calibration can assist in correcting clock drift of the clock within communication unit 105.

Once GIS 118 produces the radio characteristics, these characteristics are transferred to communication unit 105 via a protocol, such as a protocol defined in TIA/EIA/IS-95A/B and known as over the air (OTA) service activation with suitable extensions to accommodate the present invention. Upon receipt of the radio characteristics, communication unit 105 scans pilot/page/synchronization channels (broadcast channels) which are of sufficient power level to be considered useful. Continuing, if communication unit 105 scans pilot/page/synchronization channels and determines that the best cell is cell 104 having a pilot channel including PN X and within a radius range $R_1$, then the user of communication unit 105 is in the preferred zone 202 and is billed for any subsequent use of communication unit 105 on the low rate billing scale in accordance with the invention. However, if any of the radio characteristics received by communication unit 105 are not the same, the user of communication unit 105 is outside of the preferred zone 202 and is billed for any subsequent use of communication unit 105 on the high(er) rate billing scale in accordance with the invention. In the preferred embodiment, when the user of communication unit 105 is in the preferred zone 202, an indication is made to the user of communication unit 105 in the form of a light on communication unit 105, flashing of existing lights, a tone generated by communication unit 105, a text message, or some other suitable notification in accordance with the invention.

Figure 3:
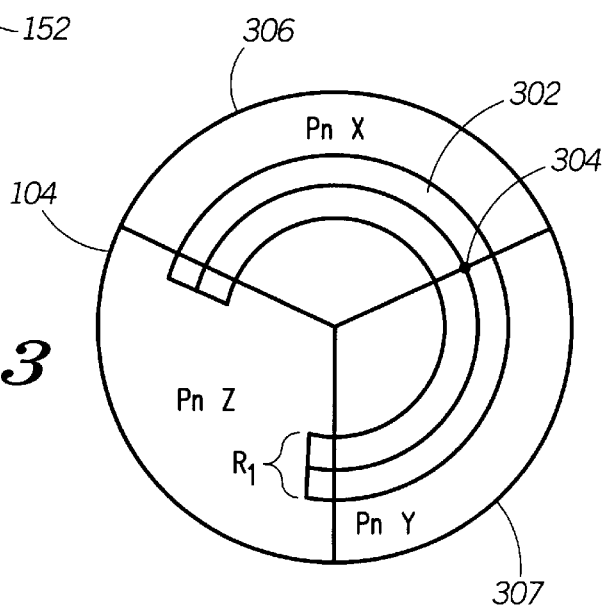
FIG. 3 generally depicts a situation where location information related to a communication unit is on the border between two sectors in accordance with the invention.

FIG. 3 generally depicts a situation where location information related to a communication unit is on the border between two sectors in accordance with the invention. In this example, the location information input into GIS 118 corresponds to location 304 shown in FIG. 3, which is essentially on the boundary of sectors 306–307 identified by the pilot channels including PN X and PN Y. In this situation, GIS 118 again correlates the location information (specifically, lat/long values corresponding to the location information) with the RF coverage plan and determines that a certain amount of RF overlap occurs between the sectors 306–307. As such, radio characteristics which identify cell 104, pilot channels including PN X and PN Y and a range offset value corresponding to radius range $R_1$ are produced and transferred to communication unit 105 in accordance with the invention. With these radio characteristics, communication unit 105 will have as its preferred zone the area 302 spanning over both sectors 306–307. As in the single sector case, if communication unit 105 scans pilot/page/synchronization channels and determines that the best cell is cell 104 having a pilot channel including PN X or PN Y and within a radius range $R_1$, then the user of communication unit 105 is in the preferred zone 302 and is billed for any subsequent use of communication unit 105 on the low rate billing scale in accordance with the invention. However, if any of the radio characteristics received by communication unit 105 are not the same, the user of communication unit 105 is outside of the preferred zone 302 and is billed for any subsequent use of communication unit 105 on the high(er) rate billing scale in accordance with the invention.

Figure 4:
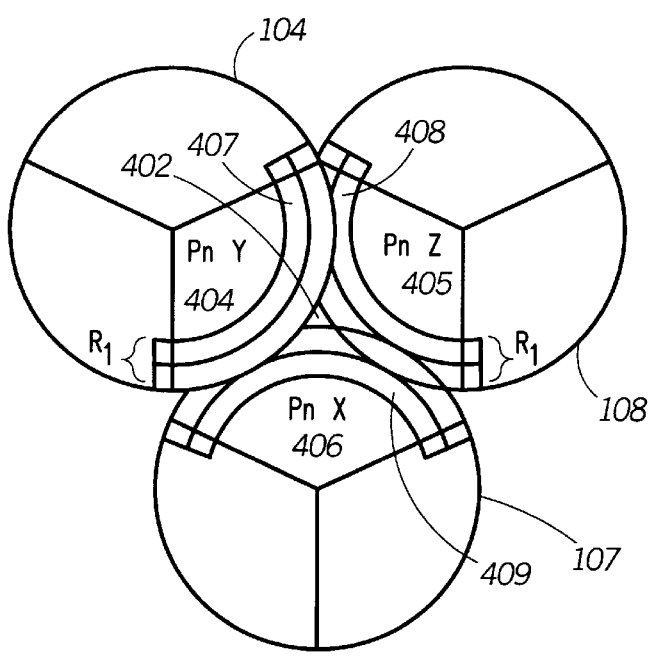
FIG. 4 generally depicts a situation where location information related to a communication unit is on the border between three cells in accordance with the invention.

FIG. 4 generally depicts a situation where location information related to a communication unit is on the border between three cells in accordance with the invention. In this example, the location information input into GIS 118 corresponds to location 402 shown in FIG. 4, which is essentially on the boundary of cells 104 and 107–108 identified by the pilot channels including PN X, PN Y and PN Z. In this situation, GIS 118 again correlates the location information (specifically, lat/long values corresponding to the location information) with the RF coverage plan and determines that a certain amount of RF overlap occurs between cells 104 and 107–108. As such, radio characteristics which identify cell 104 and 107–108, pilot channels including PN Y, PN X and PN Z respectively and a range offset value corresponding to radius range $R_1$ are produced and transferred to communication unit 105 in accordance with the invention. With these radio characteristics, communication unit 105 will have as its preferred zone the area 407–409 spanning over cells 104 and 107–108 and sectors 404–406. As in the single sector case, if communication unit 105 scans pilot/page/synchronization channels and determines that the best cell is either of cells 104 or 107–108 having a pilot channel including either PN X, PN Y or PN Z and within radius range $R_1$, then the user of communication unit 105 is in the preferred zone 302 and is billed for any subsequent use of communication unit 105 on the low rate billing scale in accordance with the invention. However, if any of the radio characteristics received by communication unit 105 are not the same, the user of communication unit 105 is outside of the preferred zones 407–409 and is billed for any subsequent use of communication unit 105 on the high(er) rate billing scale in accordance with the invention.

Thus, the present invention provides a communication system and method for determining when a communication unit is located within a preferred zone. The preferred zone is typically a portion of a cell, or alternately can be a portion of a plurality of cells. The preferred zone is calculated using the pilot signal received by the communication unit, the cell identification, and the distance of the communication unit from the transmitter transmitting the pilot signal.

In this manner, a communication unit or the infrastructure can set a zone as the preferred zone for the communication unit. This allows the infrastructure to provide vertical services based upon the preferred zone. Some examples of vertical services that can be provided include location-based billing, notification to the communication unit of whether the communication unit is in the preferred zone, location-based messaging, and restricted mobility, which refers to denying access when the user is not in the preferred zone. Restricted mobility allows the user of the communication unit to utilize the communication system while in the preferred zone, while being unable to use the system when outside of the preferred zone.

The present invention also provides for location-based services without adding additional hardware to current cellular systems, thereby increasing functionality of systems without increasing their hardware costs.

While this invention has been described in terms of certain examples thereof, it is not intended that it be limited to the above description, but rather only to the extent set forth in the claims that follow.

What is claimed is:

1. A method for determining when a communication unit is located within a preferred zone in a cellular communication system, the cellular communication system including a plurality of cells, the method comprising the steps of:

creating a preferred zone for a communication unit, wherein the preferred zone is defined by a specific cell, a pilot channel information, a pseudo-random (PN) offset code, and a range offset value corresponding to a distance of the preferred zone from a center of a cell;

obtaining radio characteristics associated with the preferred zone; and determining, based at least in part upon the radio characteristics, when the communication unit is located within the preferred zone.

2. A method for determining when a communication unit is located within a preferred zone in accordance with claim 1, wherein the step of creating a preferred zone comprises the step of creating a preferred zone that includes a plurality of cells.

3. A method for determining when a communication unit is located within a preferred zone in accordance with claim 2, wherein the step of creating a preferred zone that includes a plurality of cells comprises the step of creating a preferred zone that includes a portion of the plurality of cells.

4. A method for determining when a communication unit is located within a preferred zone in accordance with claim 1, further comprising the step of notifying a user of the communication unit when the communication unit is within the preferred zone.

5. A method for determining when a communication unit is located within a preferred zone in accordance with claim 1, wherein the step of creating a preferred zone comprises the step of creating a preferred zone based upon a predefined characteristic associated with the communication unit.

6. A method for determining when a communication unit is located within a preferred zone in accordance with claim 1, wherein the step of obtaining radio characteristics associated with the preferred zone comprises the steps of:

converting the preferred zone to radio characteristics of the preferred zone; and transferring the radio characteristics of the preferred zone to the communication unit.

7. A method for determining when a communication unit is located within a preferred zone in accordance with claim 1, wherein the step of creating a preferred zone comprises the step of creating a preferred zone upon input from a user of the communication unit.

8. A method for determining when a communication unit is located within a preferred zone in accordance with claim 1, wherein the step of obtaining radio characteristics associated with the preferred zone comprises the step of obtaining a pilot signal associated with the preferred zone.

9. A method for determining when a communication unit is located within a preferred zone in accordance with claim 1, wherein the step of obtaining radio characteristics associated with the preferred zone comprises the step of obtaining a cell identifier associated with the preferred zone.

10. A method for determining when a communication unit is located within a preferred zone in accordance with claim 1, wherein the step of obtaining radio characteristics associated with the preferred zone comprises the step of obtaining a distance from a serving pilot of the preferred zone.

11. A method for determining when a communication unit is located within a preferred zone in accordance with claim 1, wherein the step of obtaining radio characteristics associated with the preferred zone comprises the step of obtaining the latitude and the longitude of the preferred zone.

12. A method for determining when a communication unit is located within a preferred zone in accordance with claim 1, further comprising the step of denying access to the cellular communication system when the communication unit is not located in the preferred zone.

13. A method for determining when a communication unit is located within a preferred zone in accordance with claim 1, further comprising the step of sending a message from the communication unit to the cellular communication system to indicate whether the communication unit is located in the preferred zone.

14. A method for determining when a communication unit is located within a preferred zone in accordance with claim 1, wherein the step of creating a preferred zone comprises the step of creating a preferred zone based upon a street address.

15. A method for determining when a communication unit is located within a preferred zone in accordance with claim 14, wherein the step of creating a preferred zone based upon a street address comprises the step of creating a preferred zone based upon a pilot signal associated with the street address.

16. A method for determining when a communication unit is located within a preferred zone in accordance with claim 14, wherein the step of creating a preferred zone based upon a street address comprises the step of creating a preferred zone based upon a plurality of pilot signals associated with the street address.

17. A method for determining when a communication unit is located within a preferred zone in accordance with claim 14, wherein the step of creating a preferred zone based upon a street address comprises the step of creating a preferred zone based upon a cell identifier associated with the street address.

18. A method for determining when a communication unit is located within a preferred zone in accordance with claim 14, wherein the step of creating a preferred zone based upon a street address comprises the step of creating a preferred zone based upon a distance from a serving pilot of the street address.

19. A method for determining when a communication unit is located within a preferred zone in accordance with claim 1, wherein the step of creating a preferred zone comprises the step of creating a preferred zone based upon a landmark.

20. A method for determining when a communication unit is located within a preferred zone in accordance with claim 19, wherein the step of creating a preferred zone based upon a landmark comprises the step of creating a preferred zone based upon a pilot signal associated with the landmark.

21. A method for determining when a communication unit is located within a preferred zone in accordance with claim 19, wherein the step of creating a preferred zone based upon a landmark comprises the step of creating a preferred zone based upon a plurality of pilot signals associated with the landmark.

22. A method for determining when a communication unit is located within a preferred zone in accordance with claim 19, wherein the step of creating a preferred zone based upon a landmark comprises the step of creating a preferred zone based upon a zone identifier associated with the landmark.

23. A method for determining when a communication unit is located within a preferred zone in accordance with claim 19, wherein the step of creating a preferred zone based upon a landmark comprises the step of creating a preferred zone based upon a distance from a serving pilot of the landmark.

24. A method for determining when a communication unit is located within a preferred zone in accordance with claim 1, further comprising the step of calibrating the communication unit.

* * * * *